United States Patent
Wang

(10) Patent No.: US 7,680,960 B2
(45) Date of Patent: Mar. 16, 2010

(54) METHOD, APPARATUS AND SYSTEM FOR INTERWORKING BETWEEN SIGNALING NETWORKS

(75) Inventor: Yujun Wang, Shenzhen (CN)

(73) Assignee: Huawei Technologies Co., Ltd., Shenzhen, Guangdong Province (CN)

( * ) Notice: Subject to any disclaimer, the term of this patent is extended or adjusted under 35 U.S.C. 154(b) by 408 days.

(21) Appl. No.: 11/670,012

(22) Filed: Feb. 1, 2007

(65) Prior Publication Data

US 2007/0217447 A1  Sep. 20, 2007

(30) Foreign Application Priority Data

Mar. 16, 2006  (CN) .......................... 2006 1 0058538

(51) Int. Cl.
G06F 15/16 (2006.01)
(52) U.S. Cl. ...................................... 709/249; 370/228
(58) Field of Classification Search .................. 370/226, 370/351, 352, 353, 354, 355, 356; 709/223, 709/224, 238; 379/221.04
See application file for complete search history.

(56) References Cited

U.S. PATENT DOCUMENTS

| | | | |
|---|---|---|---|
| 6,052,458 A | 4/2000 | Amir-Ebrahimi | |
| 6,181,695 B1 | 1/2001 | Curry et al. | |
| 2001/0049730 A1* | 12/2001 | Brendes et al. | 709/223 |
| 2003/0031307 A1* | 2/2003 | Khadri et al. | 379/221.1 |
| 2005/0232407 A1* | 10/2005 | Craig et al. | 379/229 |

FOREIGN PATENT DOCUMENTS

| | | |
|---|---|---|
| CN | 1463127 A | 12/2003 |
| CN | 1476701 A | 2/2004 |

OTHER PUBLICATIONS

International Search Report issued in International Patent Application No. PCT/CN2006/003117, dated Mar. 15, 2007.

* cited by examiner

*Primary Examiner*—Huy D Vu
*Assistant Examiner*—James P Duffy
(74) *Attorney, Agent, or Firm*—Darby & Darby P.C.

(57) ABSTRACT

A method for interworking between a first signaling network and a second signaling network is provided. The first signaling network includes a first signaling point and a signaling transfer point, and the second signaling network includes a second signaling point, the first signaling network is connected with the second signaling network via an interworking point. The method includes: receiving by the interworking point a first signaling point TransFer Prohibited message from the first signaling network; detecting all the links between the interworking point and the first signaling network, if there is any interworking link, dropping the TransFer Prohibited message; otherwise, transmitting a Signaling Unavailable message to the second signaling point. This invention also provides an interworking point of signaling networks and a communication system. In this invention, TFP message in narrowband MTP3 protocol and DUNA message the broadband M3UA protocol are combined for informing the route state.

12 Claims, 3 Drawing Sheets

METHOD, APPARATUS AND SYSTEM FOR INTERWORKING BETWEEN SIGNALING NETWORKS

This application claims the priority of the Chinese Patent Application No. 200610058538.3, submitted on Mar. 16, 2006, entitled "Method and Apparatus for Interworking between Broadband Signaling Network and Narrowband Signaling Network", which is incorporated by reference herein for all purposes.

FIELD OF THE INVENTION

The present invention relates to a method, an apparatus and a system for interworking between signaling networks.

BACKGROUND OF THE INVENTION

The 3G ($3^{rd}$ Generation, 3rd Generation Mobile Communication System) signaling network is an important supporting network for 3G service network, and the all-IP (Internet Protocol) network represents a development trend of mobile communication. For example, WCDMA introduces an idea of soft switch to separate call control from bearer control. A MSC (Mobile Switch Center) may be divided into a MSC SERVER of the control layer and a MGW (Media Gateway) of the bearer layer.

A new signaling system is needed to support the separation of the control layer and the bearer layer. Since the control layer is only in charge of voice service, there are mainly two demands on this layer: the first is that the MSC SERVER must be able to control the remote MGW, because the MSC SERVER and the MGW may be at different locations, even in different cities. The second is that the MSC SERVERS can switch information between each other, so as to establish an end-to-end call. The conventional signaling system cannot satisfy the above-mentioned demands.

The evolution of the network towards an all-IP network is a progressive process. The future 3G signaling network will face an interworking problem between the circuit-switched-based No. 7 signaling and the IP-network-based signaling in a relatively long period of time.

An important concept used in interworking is signaling transport. In an interworking process between a narrowband signaling network and a broadband signaling network, when the interworking is implemented through M3UA (Message Transfer Part 3 User Adaptation Layer), it is a technical problem to be solved as to how to forward a TFP (TransFer Prohibited) message received from the narrowband signaling network to ensure the reliable operation of the network. In an implementation of the conventional narrowband signaling network, on receiving a TFP message whose destination signaling point is not the local office signaling point, the TFP message will be forwarded. No problem will occur in the narrowband network because there is no change in the message format during the forwarding. But at the interworking point SG (Signaling Gateway) between the broadband network and the narrowband network, on receiving a TFP message whose destination signaling point is not the local office signaling point, the TFP message needs to be transparently transported to the opposite end according to the processing in the narrowband network since this TFP message is not a message to be processed by the local office, that is, the TFP message will be transparently transported to the broadband signaling point through an M3UA message for processing.

In the above-mentioned method for transparently transporting the TFP message, it can be seen that, Firstly, the broadband signaling point has to have a part of functions of the MTP3 to be able to process the route management messages of MTP3. This is somewhat inconformable with the way of implementing adaptation function by M3UA protocol.

Secondly, with the above-mentioned method, the SG simply implements a transparent transport of route management message without performing any route analysis function, so that the SG's function of interworking between the broadband network and the narrowband network is not fully utilized.

SUMMARY OF THE INVENTION

The embodiments of the present invention provide a method, an apparatus and a system for interworking between signaling networks, which may guarantee the efficiency and reliability of the route information of the network without the transparent transport of messages.

According to an embodiment of the present invention, there is provided a method for interworking between a first signaling network and a second signaling network, wherein the first signaling network includes a first signaling point and a signaling transfer point, and the second signaling network includes a second signaling point, the first signaling network is connected with the second signaling network via an interworking point; wherein the method includes:

receiving, by the interworking point, a first signaling point TransFer Prohibited message from the first signaling network;

detecting, by the interworking point, all links between the interworking point and the first signaling point, if there is any interworking link, droping the TransFer Prohibited message; if there is no any interworking link, transmitting, by the interworking point, a Signaling Unavailable message to the second signaling point.

According to another embodiment of the present invention, there is provided a method for interworking between a first signaling network and a second signaling network, wherein the first signaling network includes a first signaling point, and the second signaling network includes a second signaling point, the first signaling network is connected with the second signaling network via an interworking point; wherein the method includes: if there is no interworking link between the interworking point and the first signaling point, transmitting by the interworking point to the second signaling point a Signaling Unavailable message informing the second signaling point that the first signaling point is unavailable.

According to yet another embodiment of the present invention, there is provided a signaling interworking point, the interworking point includes:

a receiving means, for receiving a message sent from a first signaling network;

an analyzing and detecting means, for analyzing the received message, and for detecting links between affected signaling point in the received message and the signaling interworking point when the received message is a TransFer Prohibited message;

a transmitting means, for transmitting a Singling Unavailable message to a destination signaling point of a second signaling network if the analyzing and detecting means detects that all the links between the affected signaling point and the signaling interworking point are interrupted, and for dropping the received message if the analyzing and detecting means detects that not all the links between the affected signaling point and the signaling interworking point are interrupted.

According to yet another aspect of the present invention, there is provided a communication system, the communication system includes a first signaling network and a second signaling network, the first signaling network is connected with the second signaling network via an interworking point; the first signaling network includes a first signaling point and a signaling transfer point, and the second signaling network includes a second signaling point; wherein:

the interworking point is adapted to receive messages from the first signaling network; on receiving a first signaling point TransFer Prohibited message, the interworking point detects all the links between itself and the first signaling point, and according to the detection result, drops the TransFer Prohibited message or transmit a Signaling Unavailable message to the second signaling point.

The method according to the embodiments of the present invention takes full advantages of SG's the function of interworking between signaling networks and takes the protocol advantages of the SG into account. In the method, the TFP message of the first signaling network and the DUNA message of the second signaling network are combined for informing about the route state. Thus, the number of TFP messages encapsulated through DATA message processed by the second signaling point may be reduced, and the complexity for implementing the protocol of the first signaling network by the second signaling point may be reduced.

DETAILED DESCRIPTION OF THE EMBODIMENTS

The present invention will be further detailed below with reference to the embodiments and the accompanying drawings.

In the embodiments of the present invention, a TFP message not to be processed by the local office signaling point is analyzed through the MTP3 function implemented on the SG. If the affected signaling point is discovered to be unavailable via the local office, a DUNA (Destination Unavailable) message of M3UA is encapsulated and transmitted to the broadband signaling point; otherwise, no message will be sent, and the TFP message will be dropped rather than being forwarded.

Figure 1:
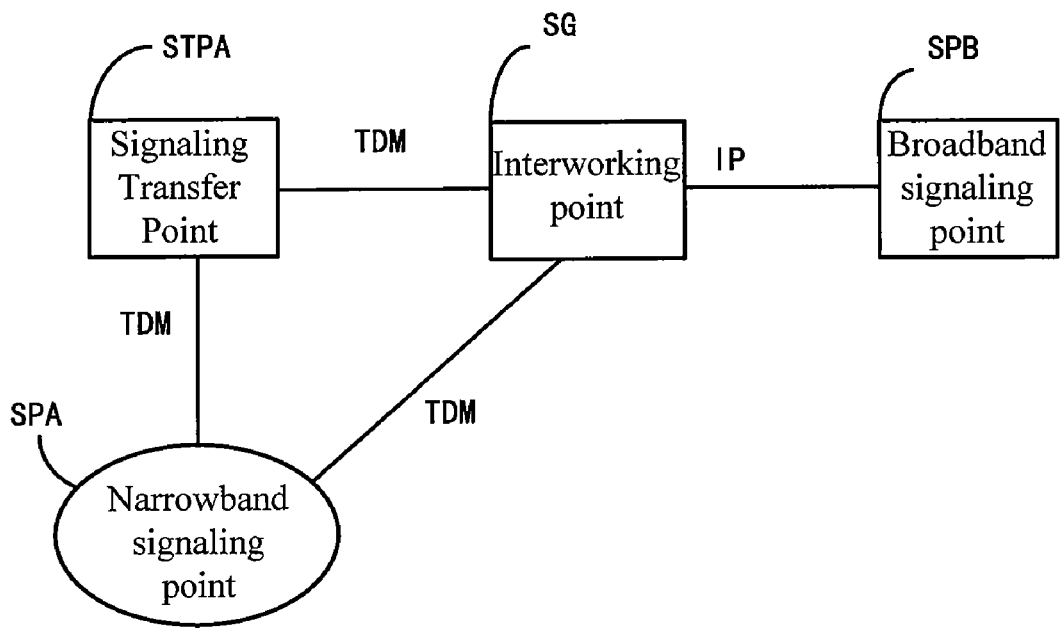
FIG. 1 is a networking diagram for interworking between a broadband signaling network and a narrowband signaling network according to an embodiment of the present invention.

FIG. 1 is a networking diagram for interworking between a narrowband signaling network and a broadband signaling network according to an embodiment of the present invention. As shown in FIG. 1, a signaling transfer point STPA and an interworking point SG are between a narrowband signaling point SPA and a broadband signaling point SPB. Wherein, the SPA may directly communicate with the SG using the TDM (Time Division Multiplex) approach, or may communicate with the SG via a STPA alternative route by using the TDM approach, while the SPB communicates with the SG over IP by using the M3UA.

Figure 2:
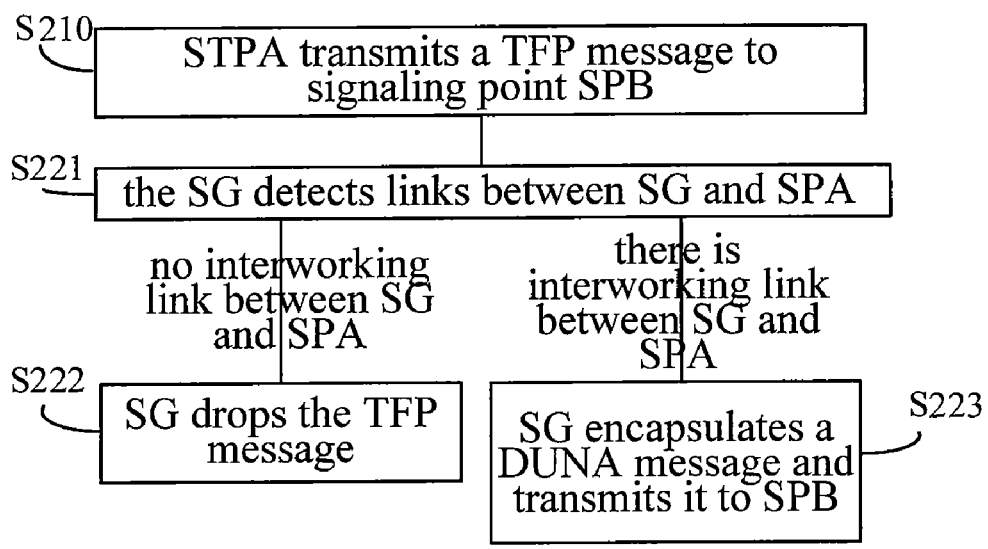
FIG. 2 is a flow diagram illustrating the method for interworking between signaling networks according to an embodiment of the present invention.

Now refer to FIG. 2 together with FIG. 1, FIG. 2 is a flow diagram illustrating a method according to an embodiment of the present invention.

Step S210, in the networking application shown in FIG. 1, if all the links between the SPA and the STPA are interrupted, the STPA will transmit to the signaling point SPB a TFP message representing the signaling route to the SPA is unavailable, in other words, the SPB cannot forward the signaling message to the SPA via the STPA.

Then, as shown in FIG. 1, the TFP message arrives at the SG. On receiving the TFP message, the SG analyzes and processes the TFP message.

Step 221, the links between the SG and the SPA are detected;

In this embodiment, as shown in FIG. 1, there are two paths from the SG to the SPA, one of which is an alternative route to the SPA via the STPA, and the other is a direct route to the SPA. Although at this time the SPA is unavailable via the alternative route, it is available via the direct route.

Step S222, if the direct route between the SG and the SPA is detected to be not in failure or the SPA is available through other routes (if the SG has also configured other alternative routes to the SPA), the SG drops the TFP message;

Step S223, if the SG detects that all the links between the SG and the SPA are interrupted, the SG will encapsulate a DUNA message of M3UA and transmit the DUNA message to the SPB, informing the SPB that the narrowband signaling point SPA is unavailable.

Those skilled in the art may recognize, through comparison with an interworking point of the prior art, that the interworking point according to an embodiment of the present invention takes full advantages of the MTP3 function thereon, and have the capabilities for message analysis and link detection.

Figure 3:
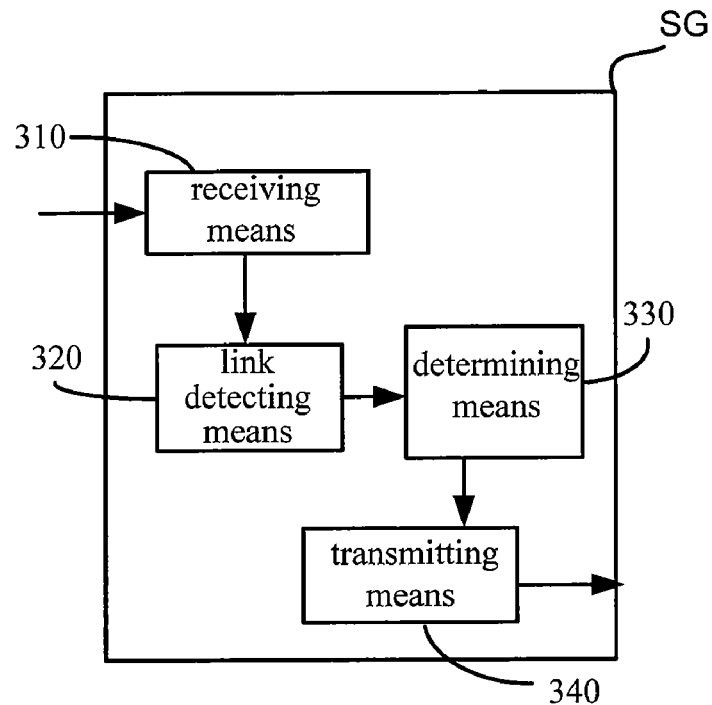
FIG. 3 is a diagram illustrating the structure of an interworking point between the broadband signaling and the narrowband signaling according to an embodiment of the present invention.

Refer to FIG. 3, which shows a diagram illustrating the structure of an interworking point between the broadband and narrowband signaling according to an embodiment of the present invention.

The SG according to the embodiment of the present invention includes a receiving means 310, a link detecting means 320, a determining means 330 and a transmitting means 340.

When the SG operates, the receiving means 310 in the SG receives the messages from the narrowband signaling network, and transmits the TFP messages in the received messages to the link detecting means 320.

The link detecting means 320 detects the links between the SG and the affected signaling point, and transmits the detection result to the determining means 330. The determining means 330 informs the transmitting means 340 of the detection result for further processing.

If the link detecting means 320 detects that the direct link between the SG and the affected signaling point is not in failure or the affected signaling point is available via other route (if the SG has also configured other route to the affected signaling point); the transmitting means 340 in the SG drops the TFP message. If the link detecting means 320 detects that all the links between the SG and the affected signaling point are interrupted, the transmitting means 340 will encapsulate a DUNA message of M3UA and transmit it to the destination signaling point, informing the destination signaling point that the affected signaling point is unavailable.

In this embodiment, as shown in FIG. 1, there are two paths from the SG to the SPA, one of which is an alternative route to the SPA via the STPA, and the other is a direct route to the SPA. Although at this time the SPA is unavailable via the alternative route, it is available via the direct route. So the transmitting means 340 in the SG drops the TFP message.

Figure 4:
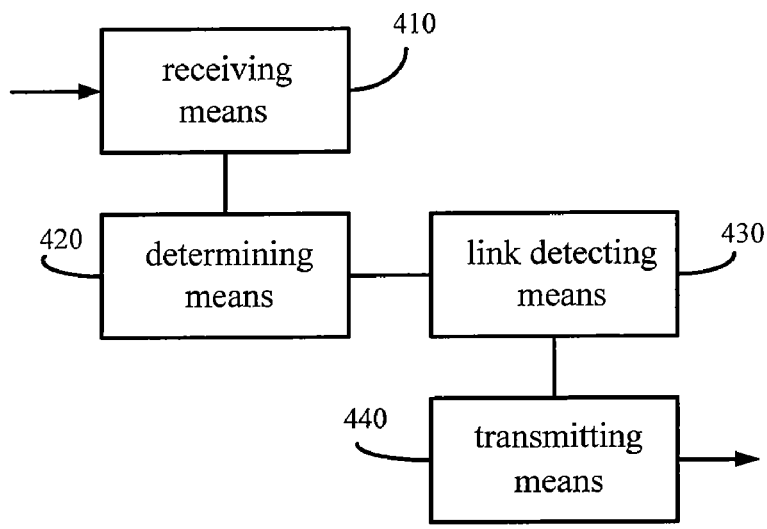
FIG. 4 is a diagram illustrating the structure of an interworking point between the broadband signaling and the narrowband signaling according to another embodiment of the present invention.

Refer to FIG. 4, which is a diagram illustrating the structure of an interworking point between the narrowband and the broadband signaling according to another embodiment of the present invention.

The SG according to the embodiment of the present invention includes a receiving means 410, a determining means 420, a link detecting means 430 and a transmitting means 440.

When the SG operates, the receiving means 410 in the SG receives a message from the narrowband signaling network. The determining means 420 of the SG analyzes the message. On determining that the received message is a TFP message, the determining means 420 of the SG transmits the TFP message to the link detecting means 430, informing the link detecting means 430 to detect the links between the affected signaling point in the TFP message and the SG.

The link detecting means 430 detects the links between the SG and the affected signaling point, and transmits the detection result to the transmitting means 440.

If the link detecting means 420 detects that the direct link between the SG and the affected signaling point has no failure or the affected signaling point is available via other route (if the SG has also configured other route to the affected signaling point), the transmitting means 440 in the SG drops the TFP message. If the link detecting means 420 detects that all the links between the SG and the affected signaling point are interrupted, the transmitting means 440 encapsulates a DUNA message of M3UA and transmits the DUNA message to the destination signaling point, informing the destination signaling point that the affected signaling point is unavailable.

Figure 5:
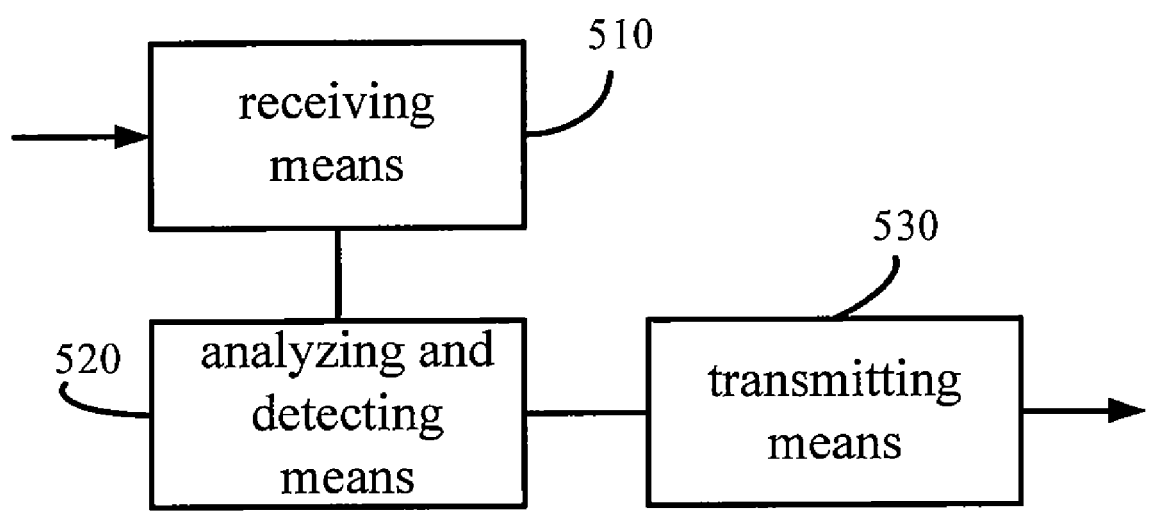
FIG. 5 is a schematic diagram illustrating the structure of an interworking point between the broadband signaling and the narrowband signaling according to an embodiment of the present invention.

Refer to FIG. 5, which is a block diagram illustrating the structure of an interworking point according to an embodiment of the present invention.

The SG according to the embodiment of the present invention includes a receiving means 510, an analyzing and detecting means 520 and a transmitting means 530.

When the SG operates, the receiving means 510 in the SG receives a message from the narrowband signaling network. The analyzing and detecting means 520 in the SG analyzes the received TFP message, detects the links between the affected signaling point in the TFP message and the SG, and transmits the detection result to the transmitting means 530.

If the analyzing and detecting means 520 detects that the direct link between the SG and the affected signaling point is not in failure or the affected signaling point is available via other route (if the SG has also configured other alternative route to the affected signaling point), the transmitting means 530 in the SG drops the TFP message. If the analyzing and detecting means 520 detects that all the links between the SG and the affected signaling point are interrupted, the transmitting means 530 encapsulates a DUNA message of M3UA and transmits the DUNA message to the destination signaling point, informing the destination signaling point that the affected signaling point is unavailable.

While the present invention has been illustrated and described with reference to some preferred embodiments, those skilled in the art should recognize that various variations and modifications can be made without departing from the spirit and scope of the present invention as defined by the accompanying claims. These variations and modifications should be considered to be within the scope of the present invention.

What is claimed is:

1. A method for interworking between a first signaling network and a second signaling network, wherein the method comprises:

receiving, by an interworking point, a first signaling point TransFer Prohibited message from the first signaling network, wherein the first signaling network comprises a first signaling point and a signaling transfer point, and the second signaling network comprises a second signaling point, the first signaling network is connected with the second signaling network via the interworking point; wherein there are two paths from the interworking point to the first signaling point, one of which is a route to the first signaling point via the signaling transfer point, and the other is a direct route to the first signaling point;

detecting, by the interworking point, all links between the interworking point and the first signaling point, if there is any interworking link, dropping the TransFer Prohibited message; if there is no interworking link, transmitting, by the interworking point, a Signaling Unavailable message to the second signaling point.

2. The method of claim 1, wherein the first signaling point TransFer Prohibited message is sent from the signaling transfer point of the first signaling network.

3. The method of claim 1, wherein the Signaling Unavailable message is a Signaling Unavailable message of Media Transfer Protocol Level 3 User Adaptation Layer.

4. The method of claim 1, wherein the first signaling network is a narrowband signaling network.

5. The method of claim 1, wherein the second signaling network is a broadband signaling network.

6. A signaling interworking point between a first signaling network and a second signaling network, wherein the signaling interworking point comprises:

a receiving unit configured to receive a message sent from the first signaling network, wherein the first signaling network comprises a first signaling point and a signaling transfer point, and the second signaling network comprises a second signaling point, the first signaling network is connected with the second signaling network via the signaling interworking point; wherein there are two paths from the signaling interworking point to the first signaling point, one of which is a route to the first signaling point via the signaling transfer point, and the other is a direct route to the first signaling point;

an analyzing and detecting unit configured to analyze the received message, and detect links between affected signaling point in the received message and the signaling interworking point when the received message is a TransFer Prohibited message;

a transmitting unit configured to transmit a Signaling Unavailable message to the second signaling point of the second signaling network if the analyzing and detecting unit detects that all the links between the affected signaling point and the signaling interworking point are interrupted, and drop the received message if the analyzing and detecting unit detects that not all the links between the affected signaling point and the signaling interworking point are interrupted.

7. The signaling interworking point of claim 6, wherein the analyzing and detecting unit comprises:

a determining unit configured to determine whether the received massage is a TransFer Prohibited message sent from a signaling transfer point of the first signaling network, and if yes, informing a link detecting unit;
a link detecting unit configured to detect the links between the affected signaling point and the signaling interworking point, and transmit the detection result to the transmitting unit.

8. The interworking point of claim 6, wherein the analyzing and detecting unit comprises:
a link detecting unit configured to detect links between the affected signaling point in the TransFer Prohibited massage received by the receiving unit and the signaling interworking point;
a determining unit configured to determine the detection result of the link detecting unit, and transmit the detection result to the transmitting unit.

9. A communication system, comprising a first signaling network and a second signaling network, the first signaling network is connected with the second signaling network via an interworking point; the first signaling network comprises a first signaling point and a signaling transfer point, and the second signaling network comprises a second signaling point; wherein there are two paths from the interworking point to the first signaling point, one of which is a route to the first signaling point via the signaling transfer point, and the other is a direct route to the first signaling point, wherein:
the interworking point is adapted to receive messages from the first signaling network; on receiving a first signaling point TransFer Prohibited message, the interworking point detects all the links between itself and the first signaling point, and according to the detection result, drops the TransFer Prohibited message or transmit a Signaling Unavailable message to the second signaling point.

10. A communication device between a first signaling network and a second signaling network, wherein the communication device is configured to implement a method comprising:
receiving a message sent from the first signaling network, wherein the first signaling network comprises a first signaling point and a signaling transfer point, and the second signaling network comprises a second signaling point, the first signaling network is connected with the second signaling network via the communication device; wherein there are two paths from the communication device to the first signaling point, one of which is a route to the first signaling point via the signaling transfer point, and the other is a direct route to the first signaling point;
analyzing the received message, and detecting links between an affected signaling point in the received message and the communication device when the received message is a TransFer Prohibited message; and
transmitting a Signaling Unavailable message to the second signaling point of the second signaling network if it is detected that all the links between the affected signaling point and the communication device are interrupted, and dropping the received message if it is detected that not all the links between the affected signaling point and the communication device are interrupted.

11. A communication device of claim 10, wherein analyzing the received message and detecting links between an affected signaling point in the received message and the signaling interworking point when the received message is a TransFer Prohibited message comprises:
determining whether the received massage is a TransFer Prohibited message sent from a signaling transfer point of the first signaling network; and
detecting the links between the affected signaling point and the signaling interworking point if the received massage is a TransFer Prohibited message.

12. A communication device of claim 10, wherein analyzing the received message and detecting links between an affected signaling point in the received message and the signaling interworking point when the received message is a TransFer Prohibited message comprises:
detecting links between the affected signaling point in the TransFer Prohibited massage and the signaling interworking point; and
determining the detection result.

* * * * *